(12) United States Patent
Tame

(10) Patent No.: US 6,520,581 B1
(45) Date of Patent: Feb. 18, 2003

(54) KNEELING AND TUMBLING AUTOMOTIVE SEATING ASSEMBLY

(75) Inventor: Omar D. Tame, West Bloomfield, MI (US)

(73) Assignee: Magna Interior Systems Inc., Aurora (CA)

( * ) Notice: Subject to any disclaimer, the term of this patent is extended or adjusted under 35 U.S.C. 154(b) by 0 days.

(21) Appl. No.: 09/743,406

(22) PCT Filed: Jul. 14, 1999

(86) PCT No.: PCT/CA99/00648

§ 371 (c)(1),
(2), (4) Date: Jan. 8, 2001

(87) PCT Pub. No.: WO00/03892

PCT Pub. Date: Jan. 27, 2000

Related U.S. Application Data

(60) Provisional application No. 60/092,750, filed on Jul. 14, 1998.

(51) Int. Cl.$^7$ .................................................. B60N 2/02
(52) U.S. Cl. ............... 297/336; 297/378.12; 297/344.1; 296/65.01
(58) Field of Search ............................. 297/344.1, 334, 297/378.12, 336, 335, 331, 340, 326, 354.12, 378.1, 15; 296/65.03, 65.05, 65.09, 65.01; 248/503.1

(56) References Cited

U.S. PATENT DOCUMENTS

| | | | | | |
|---|---|---|---|---|---|
| 4,699,418 A | * | 10/1987 | Plavetich | .................. | 296/65.09 |
| 4,957,321 A | * | 9/1990 | Martin et al. | ............. | 296/65.09 |
| 5,195,795 A | * | 3/1993 | Cannera et al. | .......... | 296/65.09 |
| 6,024,411 A | * | 2/2000 | Pesta et al. | ............... | 296/65.01 |
| 6,113,191 A | * | 9/2000 | Seibold | ....................... | 297/322 |
| 6,123,380 A | * | 9/2000 | Sturt et al. | ................. | 296/65.09 |
| 6,135,555 A | * | 10/2000 | Liu et al. | ..................... | 297/336 |
| 6,375,246 B1 | * | 4/2002 | Nicola et al. | ............. | 296/65.03 |
| 6,375,255 B1 | * | 4/2002 | Maruta et al. | ........... | 296/65.01 |
| 6,435,589 B2 | * | 8/2002 | Shimizu et al. | .......... | 296/65.05 |

* cited by examiner

Primary Examiner—Anthony D. Barfield
Assistant Examiner—Stephanie Harris
(74) Attorney, Agent, or Firm—Robert F. McBeth

(57) ABSTRACT

An automotive seat assembly (14) has a seat cushion assembly (13) and a seat back assembly (17). A pair of rear seat supports (28) are pivotally mounted to the rearward end (20) of the seat cushion assembly (13) for supporting a rear portion of the seat assembly (14). A pair of front seat supports (30), which each include a pair of legs (36, 38), are mounted to the forward end (18) of the seat cushion assembly (13) for supporting a front portion of the seat assembly (14). A link (40) interconnects each of the front seat supports (30) to a corresponding rear seat support (28) for moving the rear seat supports (28) between a seating position and a tumbled position. In the seating position, the front (30) and rear seat supports (28) extend downwardly from the seat cushion assembly (13). In the tumbled position, the seat cushion assembly (13) pivots upward about the front seat supports (30) and the rear seat supports (28) fold against the seat cushion assembly (13). The seat assembly (14) is characterized by each of the front seat supports (30) being pivotally mounted to the seat cushion assembly (13) for movement between the seating position an a kneeled position with the front (30) and rear seat supports (28) collapsed against the seat cushion assembly (13) and the vehicle floor (26). Additionally, the seat assembly (14) may be tumbled forward from the kneeled position.

21 Claims, 7 Drawing Sheets

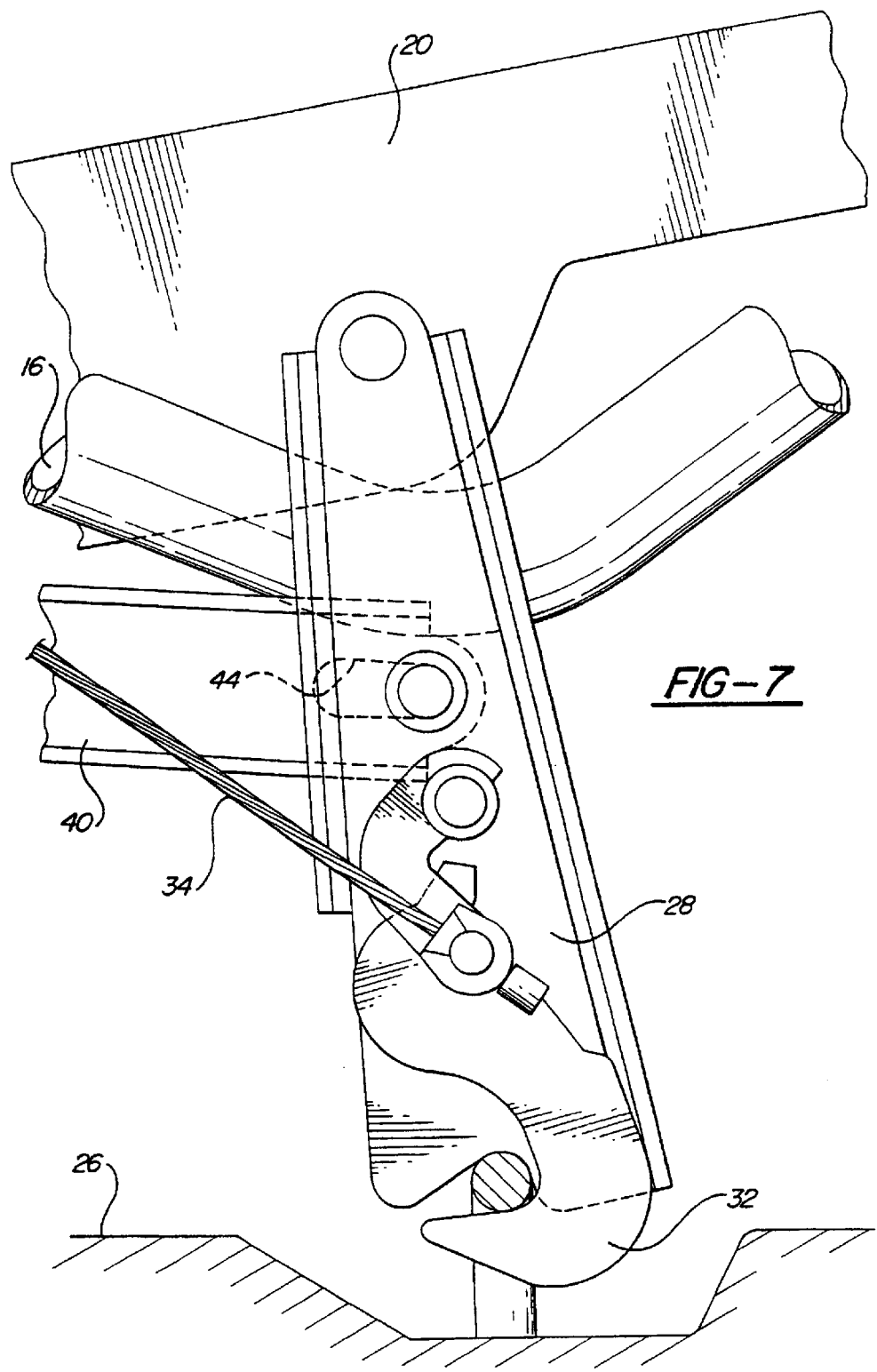

KNEELING AND TUMBLING AUTOMOTIVE SEATING ASSEMBLY

This application claims the benefit of Provisional Application Ser. No. 60/092,750 filed Jul. 14, 1998.

FIELD OF THE INVENTION

The subject invention relates to kneeling and tumbling automotive seat assemblies.

DESCRIPTION OF THE PRIOR ART

Conventional automotive seat assemblies include a seat cushion and a seat back mounted to a seat riser. The seat riser typically includes a pair of front and rear seat supports mounted to a vehicle floor. Many of today's vehicles, such as vans, mini-vans and sport utility vehicles, have a second and/or third row seat which may be manipulated to provide additional storage space within the vehicle. There have been a number of different designs for reducing the amount of space that a seat occupies within the vehicle.

Some seat assemblies have latches on both of the seat supports such that the seat may be completely removed from the vehicle. Other seat assemblies have latches on the rear seat support such that the seat can "tumble" forward about the front seat support. An example of one such tumbling seat assembly is disclosed in U.S. Pat. No. 5,662,368. Yet another design is to have the seat assembly "kneel" against the floor of the vehicle. An example of a kneeling seat assembly is shown in U.S. Pat. No. 4,932,706. None of the prior art seat assemblies, however, are capable of combining the advantages of a tumbling seat with a kneeling seat.

There remains a need for an automotive seat assembly which is capable of either tumbling forward and/or kneeling downward to provide additional cargo space within the vehicle.

SUMMARY OF THE INVENTION AND ADVANTAGES

The disadvantages of the prior art may be overcome by providing a seat assembly which may be either tumbled forward and/or kneeled downward to create additional cargo spaced within a vehicle.

It is also desirable to provide a seat assembly which may be tumbled forward from the kneeled position.

According to one aspect of the invention, there is provided an automotive seat assembly comprising a seat cushion assembly having forward and rearward ends. A seat back assembly is pivotally mounted to the seat cushion assembly. A pair of rear seat supports are pivotally mounted to the rearward end of the seat cushion assembly for supporting a rear portion of the seat assembly. A pair of front seat supports are mounted to the forward end of the seat cushion assembly for supporting a front portion of the seat assembly. A link interconnects each of the front seat supports to a corresponding rear seat support for providing relative concurrent movement of the front and rear seat supports between a seating position with the front and rear seat supports extending downwardly from the seat cushion assembly for supporting a seat occupant above a vehicle floor and a tumbled position with the seat cushion assembly pivoting upward about the front seat supports and the rear seat supports folding against the seat cushion assembly. The seat assembly is characterized by each of the front seat supports being pivotally mounted to the seat cushion assembly for movement between the seating position with the front and rear seat supports extending downwardly from the seat cushion assembly and a kneeled position with the front and rear seat supports collapsed against the seat cushion assembly and the vehicle floor.

BRIEF DESCRIPTION OF THE DRAWINGS

Other advantages of the present invention will be readily appreciated as the same becomes better understood by reference to the following detailed description when considered in connection with the accompanying drawings wherein:

FIG. 7 is an enlarged detailed view of a rear seat support.

DETAILED DESCRIPTION OF THE PREFERRED EMBODIMENT

Figure 1:
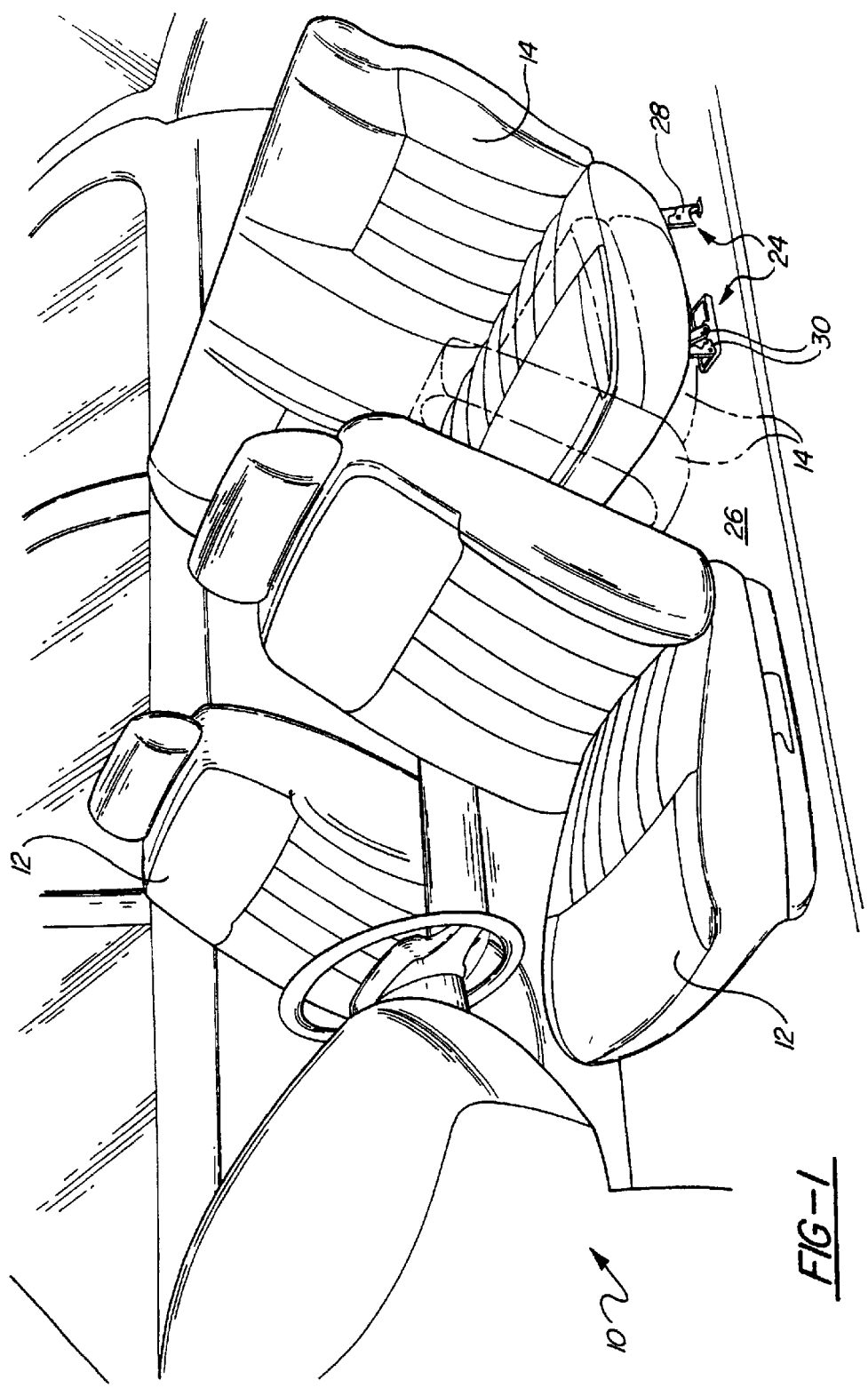
FIG. 1 is a perspective view of a vehicle incorporating a seat assembly in accordance with the subject invention.

Referring to the Figures, wherein like numerals indicate like or corresponding parts throughout the several views, a vehicle having a plurality of seat assemblies 12, 14 is generally shown at 10. The vehicle 10 is illustrated as a sport utility or mini van type automobile as is known in the art. The seat assemblies include a pair of front row bucket seats 12 and a second row bench type seat 14. For purposes of the subject invention, the second row bench seat assembly 14 will be discussed in greater detail and incorporate the aspects of the subject invention. As appreciated, the subject invention may be implemented within a third row seat and/or the front row seats 12.

Referring to FIGS. 2 through 5, the second row seat assembly 14 comprises a seat cushion assembly 13 comprising a cushion 15 and a frame 16 having forward 18 and rearward 20 ends. A seat back assembly 17 comprises a frame 22 which is pivotally mounted to the rearward end 20 of the seat cushion frame 16. The seat cushion assembly 13 and the seat back assembly 17 are of a conventional structure as is known in the art. As is also known by those skilled in the art, each of the seat cushion assembly 13 and the seat back assembly 17 is preferably includes a foam pad and a suitable trim material such as cloth or leather.

A riser assembly, generally shown at 24, supports the seat cushion frame 16 and subsequently the entire seat assembly 14 above a floor 26 of the vehicle 10. The seat riser 24 includes a pair of rear seat supports 28 pivotally mounted to the rearward end 20 of the seat cushion frame 16 for supporting a rear portion of the seat assembly 14. The seat riser 24 also includes a pair of front seat supports 30 mounted to the forward end 18 of the seat cushion frame 16 for supporting a front portion of the seat assembly 14. For illustrative purposes, only one side of the seat assembly and one set of front 30 and rear 28 seat supports is shown and discussed in detail. It is understood that the opposing side of the seat assembly 14 and the corresponding front 30 and rear 28 seat supports are substantially identical to the ones shown.

Each of the rear seat supports 28 preferably include a latch 32 for selectively securing the rear seat supports 28 to the vehicle floor 26. A rear control cable 34 is mounted to the latch 32 for controlling the operation of the latch 32 from a remote handle (not shown). Each of the front seat supports 30 preferably include first 36 and second 38 legs. The front 30 and rear 28 seat supports and their operation are discussed in greater detail hereinbelow. As appreciated, the front 30 and rear 28 seat supports may be of any suitable design or configuration without deviating from the overall scope of the subject invention.

Figure 2:
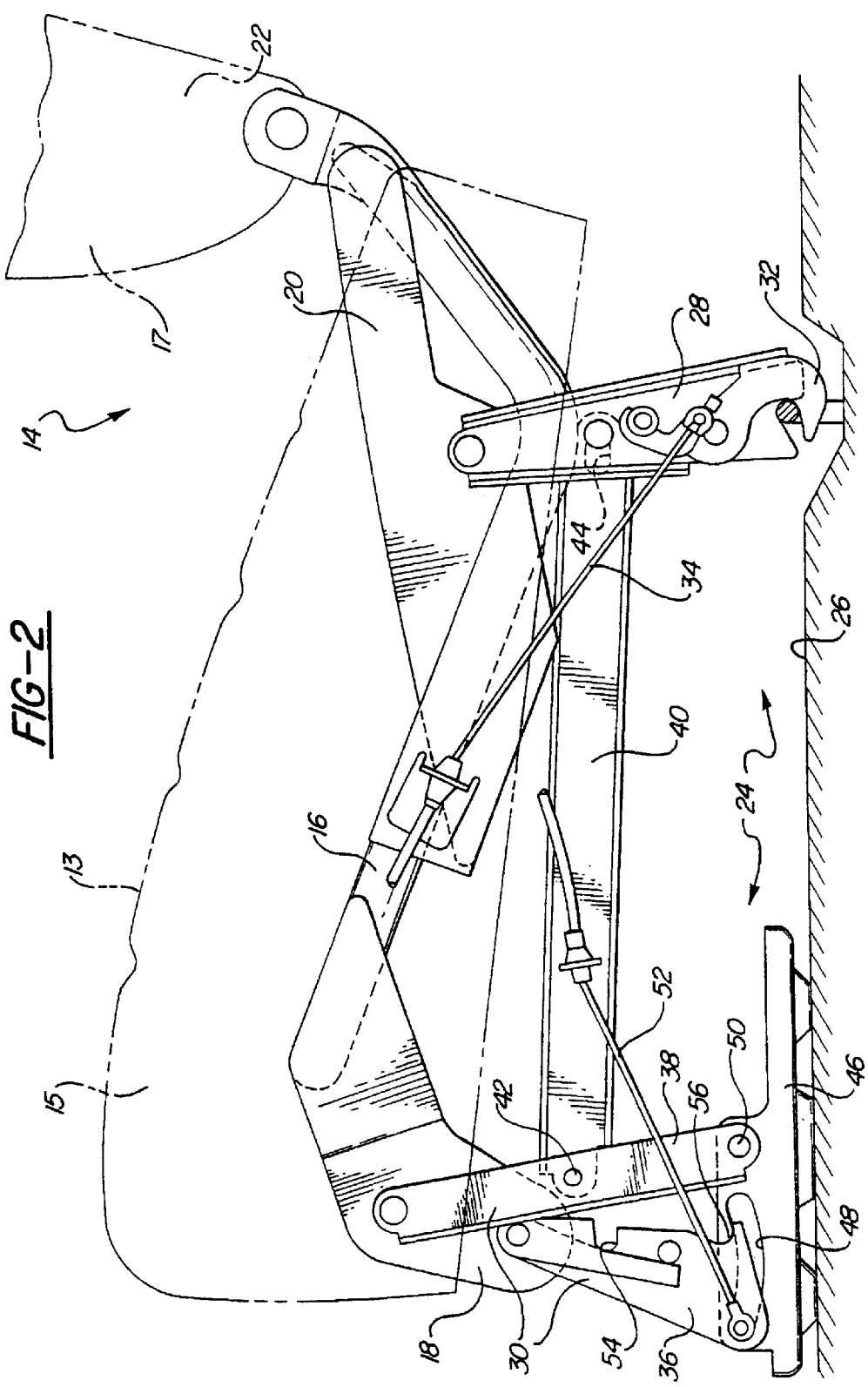
FIG. 2 is a side view of a second row seat assembly in a seating position.
Figure 3:
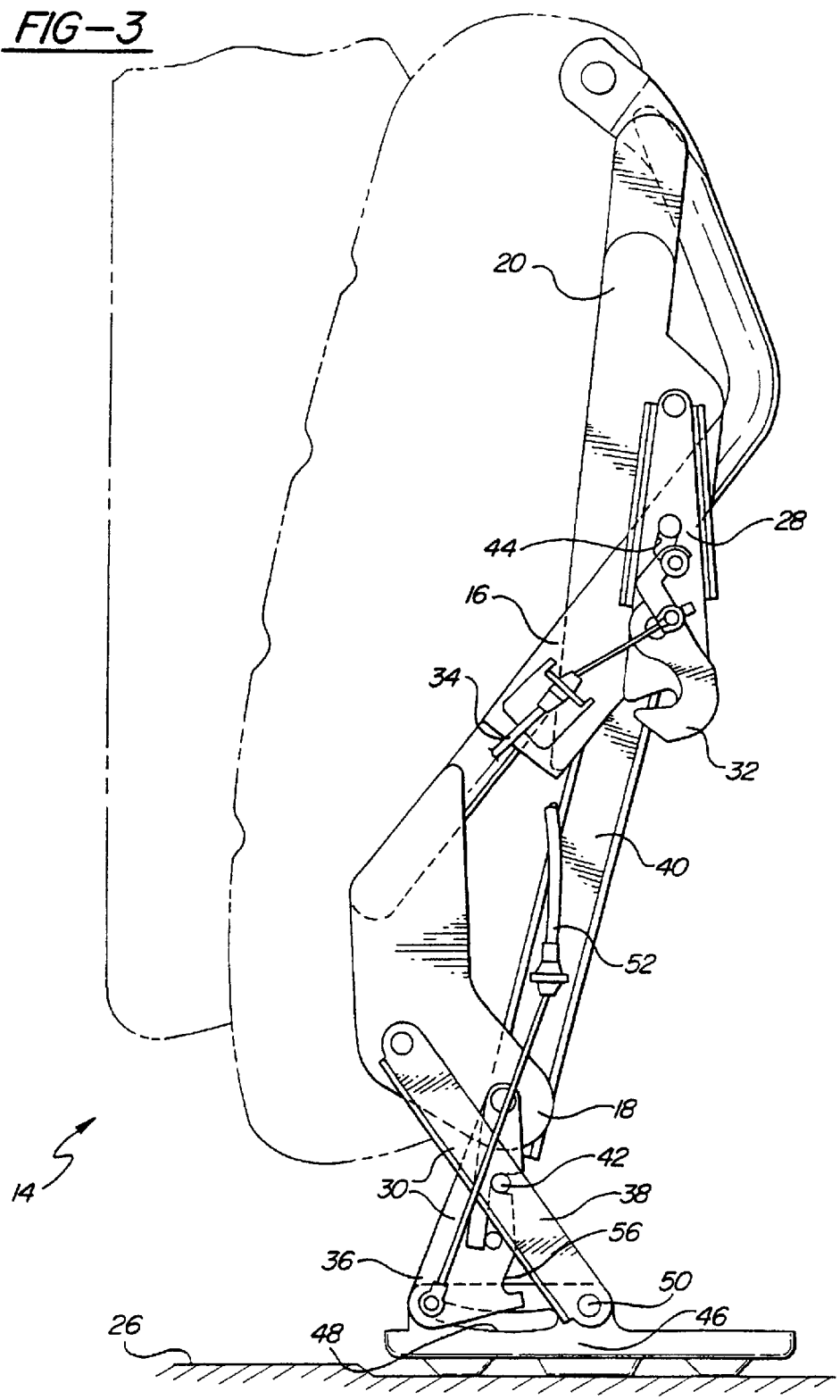
FIG. 3 is a side view of the seat assembly in a tumbled position.

A link 40 interconnects each of the front seat supports 30 to a corresponding rear seat support 28 for providing relative concurrent movement of the front 30 and rear 28 seat supports. Again, for illustrative purposes, only one link 40 is shown. The link 40 moves the front 30 and rear 28 seat supports between a seating position, as shown in FIG. 2, and a tumbled position, as shown in FIG. 3. The seating position is also shown in FIG. 1 by the solid lines and the tumbled position is shown in phantom. The seating position has the front 30 and rear 28 seat supports extending downwardly from the seat cushion frame 16 for supporting a seat occupant above the vehicle floor 26 (FIG. 2). The tumbled position pivots the seat cushion frame 16 upward about the front seat supports 30 and the rear seat supports 28 fold against the seat cushion frame 16 (FIG. 3).

Each of the links 40 include first and second ends with the first end pivotally mounted to the second leg 38 to define an intermediate pivot point 42 on the second leg 38. The second end of each of the links 40 is pivotally mounted to a corresponding rear seat support 28 and includes an integral slot 44 for allowing relative sliding movement between the link 40 and the rear seat support 28. This particular support/link arrangement allows the rear seat support 28 to collapse against the seat cushion frame 16 once the seat is moved to the tumbled position as shown in FIG. 3. Specifically, the rear control cable 34 actuates each of the latches 32 from a locked condition to an unlocked condition to release the rear seat supports 28, thereby selectively release the rear seat supports 28 when the seat assembly 14 moves into the tumbled position.

Figure 4:
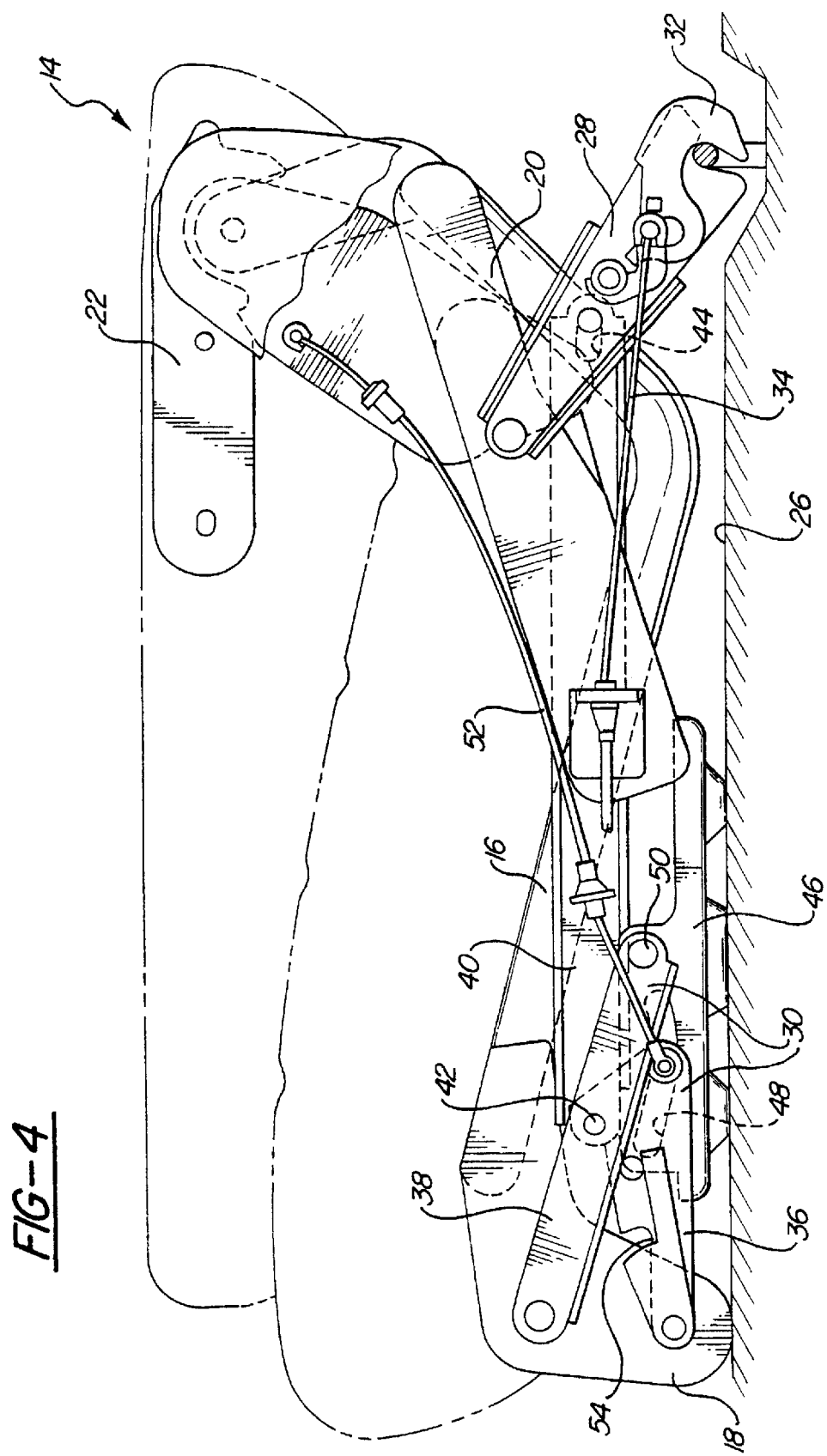
FIG. 4 is a side view of the seat assembly in a kneeled position.

The seat assembly 14 is characterized by each of the front seat supports 30 being pivotally mounted to the seat cushion frame 16 for movement between the seating position, FIG. 2, and a kneeled position as shown in FIG. 4. The kneeled position collapses the front 30 and rear 28 seat supports against the seat cushion frame 16 and the vehicle floor 26. The kneeled position is also shown in phantom in FIG. 1. Preferably, the first 36 and second 38 legs are each pivotally mounted to the seat cushion frame 16.

A mounting plate 46, having first and second ends, rotatably secures each of the legs 36, 38 of the front seat supports 30 to the vehicle floor 26. The first leg 36 is pivotally mounted to the first end of the mounting plate 46 and the second leg 38 is pivotally mounted to the second end of the mounting plate 46 for creating a substantially triangular support configuration. This triangular support configuration provides a secure structure for the seat assembly 14 when the seat assembly 14 is in the seating position. Hence, the seat assembly 14 cannot collapse into the tumbled position without eliminating this triangular support configuration. Preferably, the first end of the mounting plate 46 includes an integral arcuate slot 48 and the second end of the mounting plate 46 includes a pivot point 50. Even more preferably, the first leg 36 pivotally rides within the arcuate slot 48 and the second leg 38 is pivotally mounted to the pivot point 50.

A front control cable 52 moves the front seat supports 30 from the seating position, extending downwardly from the seat cushion frame 16, to the kneeled position with the front seat supports 30 collapsed against the seat cushion frame 16. Specifically, the front control cable 52 is connected to the first leg 36 for selectively moving the first leg 36 within the arcuate slot 48 toward the pivot point 50 thereby eliminating the substantially triangular support configuration and allowing the front seat support 30 to collapse against the seat cushion frame 16.

Figure 6:
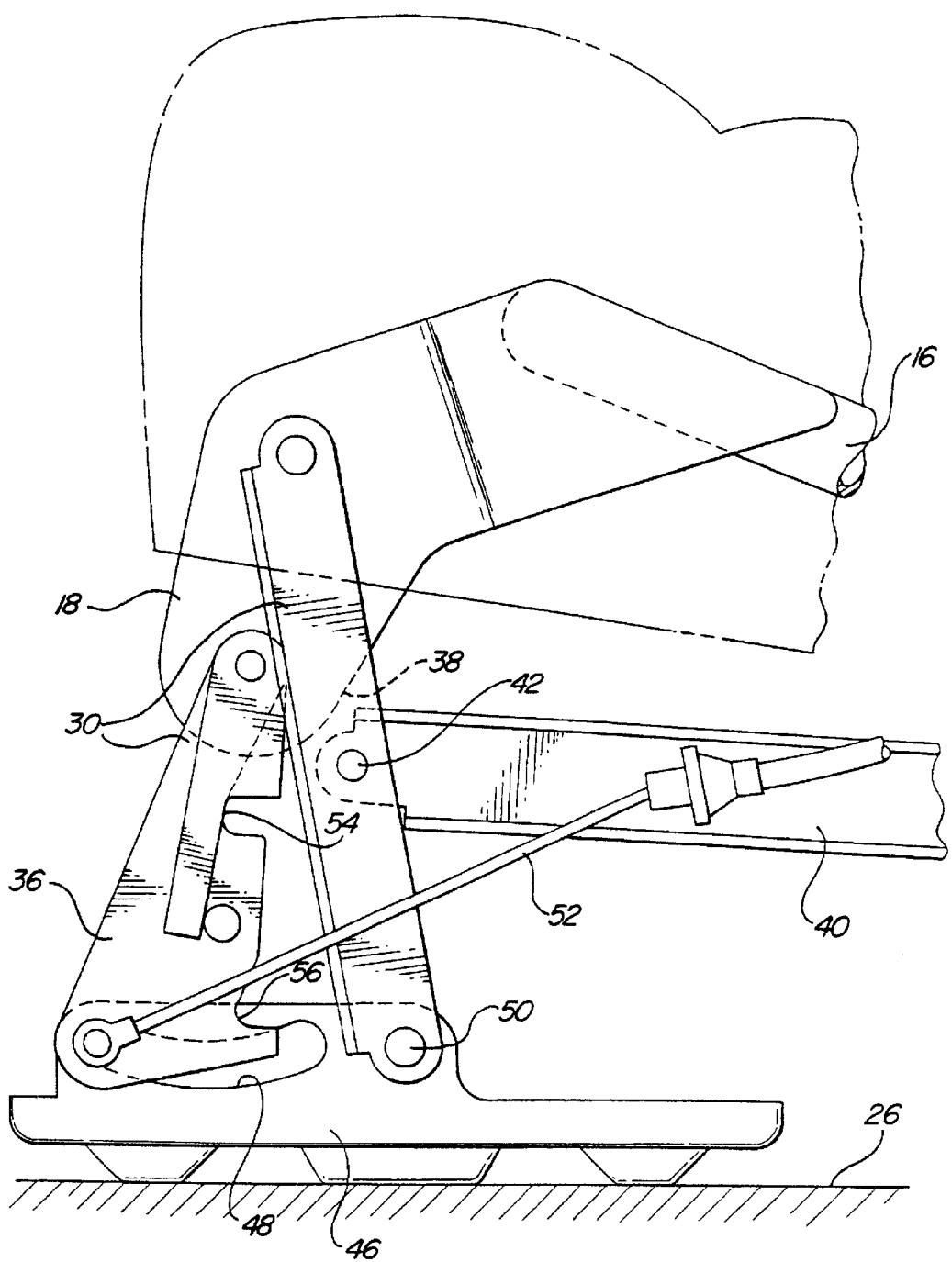
FIG. 6 is an enlarged detailed view of a front seat support.

Referring also to FIGS. 6 and 7, the front 30 and rear 28 seat supports are shown in greater detail. With particular reference to FIG. 6, the first leg 36 includes a first stop 54 which engages the intermediate pivot point 42 of the second leg 38 when the seat assembly 14 is moved to the tumbled position such that the seat assembly 14 is secured in the tumbled position. The first leg 36 also includes a second stop 56 which engages the intermediate pivot point 42 of the second leg 38 when the seat assembly 14 is moved to the kneeling position such that the seat assembly 14 is secured in the kneeling position.

During operation of the seat assembly 14, the seat back frame 22 is initially positioned in the seating position relative to the seat cushion frame 16 as shown in FIG. 2. The user then releases the seat back frame 22 and pushes the seat back frame 22 over laying the seat cushion frame 16. The user now has an option to either tumble the seat assembly 14 forward or kneel the seat assembly 14 downward. To tumble the seat assembly 14 the user actuates the rear control cable 34 which releases the latches 32. The user then lifts the seat assembly 14 upward until the intermediate pivot point 42 on the second leg 38 engages the first stop 52 on the first leg 36 as shown in FIG. 3. The links 40 cooperate with the movement of the second leg 38 and pulls the rear latches 32 inward toward the seat cushion frame 16. This is advantageous such that the rear seat supports 28 do not project outward from the seat cushion frame 16 were they could potentially cause injury. The tumbled position of the seat assembly 14 provides additional cargo space for the interior of the vehicle 10.

Figure 5:
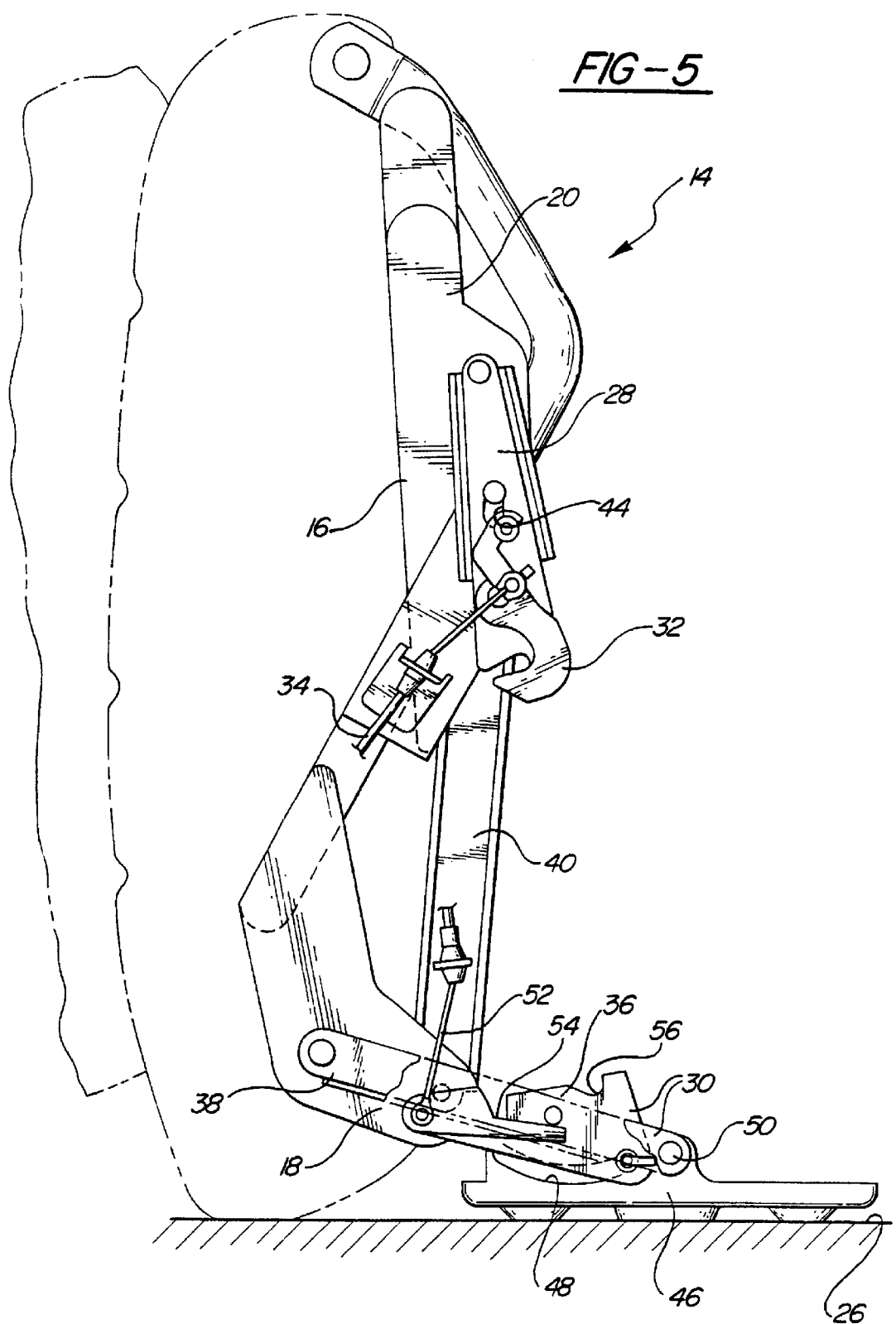
FIG. 5 is a side view of the seat assembly in a kneeled and tumbled position.

To kneel the seat assembly 14 from the seating position, the user actuates the front control cable 52 which pulls the second leg 38 rearward. Specifically, the second leg 38 slides backward within the arcuate slot 48 toward the pivot point 50 to collapse the triangular support configuration. The user can then push the seat assembly 14 downward toward the vehicle floor 26 and the front 30 and rear 28 seat supports automatically collapse against the seat cushion frame 16 as shown in FIG. 4. The intermediate pivot point 42 engages the second stop 56 on the first leg 36 to hold the seat assembly 14 in the kneeled position. The seat assembly 14 may also be tumbled from this kneeled position which creates an additional position for the seat assembly 14. Specifically, the user actuates the rear control cable 34 and lifts the seat assembly 14 upward from the kneeled position. The first 36 and second 38 legs remain substantially in the kneeled position and the link 40 pulls the rear seat supports 28 against the seat cushion frame 16 as shown in FIG. 5. The seat assembly 14 tumbles forward until the forward ends of the seat cushion and seat cushion frame 16 abut the floor 26 of the vehicle 10. This position of the seat assembly 14 provides even more cargo space for the interior of the vehicle 10.

The invention has been described in an illustrative manner, and it is to be understood that the terminology which has been used is intended to be in the nature of words of description rather than of limitation. It is now apparent to those skilled in the art that many modifications and variations of the present invention are possible in light of the above teachings. It is, therefore, to be understood that within the scope of the appended claims the invention may be practiced otherwise than as specifically described.

What is claimed is:

1. An automotive seat assembly comprising;
   a seat cushion frame (16) having forward (18) and rearward (20) ends,
   a seat back frame (22) pivotally mounted to said seat cushion frame (16),
   a pair of rear seat supports (28) pivotally mounted to said rearward end (20) of said seat cushion frame (16) for supporting a rear portion of said seat assembly,
   a pair of front seat supports (30) mounted to said forward end (18) of said seat cushion frame (16) for supporting a front portion of said seat assembly, and
   a link (40) interconnecting each of said front seat supports (30) to a corresponding rear seat support (29) for providing relative concurrent movement of said front (30) and rear (28) seat supports between a seating position with said front (30) and rear (28) seat supports extending downwardly from said seat cushion frame (16) for supporting a seat occupant above a vehicle floor (26) and a tumbled position with said seat cushion frame (16) pivoting upward about said front seat supports (30) and said rear seat supports (28) folding against said seat cushion frame (16),
   said seat assembly characterized by each of said front seat supports (30) being pivotally mounted to said seat cushion frame (16) for movement between said seating position with said front (30) and rear (28) seat supports extending downwardly from said seat cushion frame (16) and a kneeled position with said front (30) and rear (28) seat supports collapsed against said seat cushion frame (16) and the vehicle floor (26).

2. An assembly as set forth in claim 1 wherein each of said rear seat supports (28) include a latch (32) for selectively securing said rear seat supports (28) to the vehicle floor (26) and selectively releasing said rear seat supports (28) when said seat assembly moves into said tumbled position.

3. An assembly as set forth in claim 2 further including a rear control cable (34) for actuating said latches (32) from a locked condition to an unlocked condition to release said rear seat supports (28).

4. An assembly as set forth in claim 2 further including a front control cable (52) for moving said front seat supports (30) fron said seating position extending downwardly from said seat cushion frame (16) to said kneeled position with said front seat supports (30) collapsed against said seat cushion frame (16).

5. An assembly as set forth in claim 4 wherein each of said front seat supports (30) comprises first (36) and second (38) legs pivotally mounted to said seat cushion frame (16).

6. An assembly as set forth in claim 5 further including a mounting plate (46) having first and second ends for rotatably securing each of said legs (36, 38) of said front seat supports (30) to the vehicle floor (26).

7. An assembly as set forth in claim 6 wherein said first leg (36) is pivotally mounted to said first end of said mounting plate (46) and said second leg (38) is pivotally mounted to said second end of said mounting plate (46) for creating a substantially triangular support configuration.

8. An assembly as set forth in claim 7 wherein said first end of said mounting plate (46) includes an integral arcuate slot (48) and said second end of said mounting plate (46) includes a pivot point (50).

9. An assembly as set forth in claim 8 wherein said first leg (36) pivotally rides within said arcuate slot (48) and said second leg (38) is pivotally mounted to said pivot point (50).

10. An assembly as set forth in claim 9 wherein said front control cable (52) is connected to said first leg (36) for selectively moving said first leg (36) within said arcuate slot (48) toward said pivot point (50) thereby eliminating said substantially triangular support configuration and allowing said front seat supports (30) to collapse against said seat cushion frame (16).

11. An assembly as set forth in claim 5 wherein each of said links (40) include first and second ends with said first end pivotally mounted to said second leg (38) to define an intermediate pivot point (42) on said second leg (38).

12. An assembly as set forth in claim 11 wherein said second end of each of said links (40) is pivotally mounted to a corresponding rear seat support (28) and includes an integral slot (44) for allowing relative sliding movement between said link (40) and said rear seat supports (28).

13. An assembly as set forth in claim 12 wherein said first leg (36) includes a first stop (54) which engages said intermediate pivot point (42) of said second leg (38) when said seat assembly is moved to said tumbled position such that said seat assembly is secured in said tumbled position.

14. An assembly as set forth in claim 13 wherein said first leg (36) includes a second stop (56) which engages said intermediate pivot point (42) of said second leg (38) when said seat assembly is moved to said kneeling position such that said seat assembly is secured in said kneeling position.

15. A seat riser assembly for an automotive seat assembly having a seat cushion assembly having forward (18) and rearward (20) ends and a seat back assembly pivotally mounted to said seat cushion, said seat riser assembly comprising:
   a pair of rear seat supports (28) pivotally mounted to said rearward end (20) of said seat cushion frame (16) for supporting a rear portion of said seat assembly,
   a pair of front seat supports (30) mounted to said forward end (18) of said seat cushion frame (16) for supporting a front portion of said seat assembly, and
   a link (40) interconnecting each of said front seat supports (30) to a corresponding rear seat support (28) for providing relative concurrent movement of said front (30) and rear (28) seat supports between a seating position with said front (30) and rear (28) seat supports extending downwardly from said seat cushion frame (16) for supporting a seat occupant above a vehicle floor (26) and a tumbled position with said seat cushion frame (16) pivoting upward about said front seat supports (30) and said rear seat supports (28) folding against said seat cushion frame (16),
   said seat riser assembly characterized by each of said front seat supports (30) being pivotally mounted to said seat cushion frame (16) for movement between said seating position with said front (30) and rear (28) seat supports extending downwardly from said seat cushion frame (16) and a kneeled position with said front (30) and rear (28) seat supports collapsed against said seat cushion frame (16) and the vehicle floor (26).

16. An assembly as set forth in claim 15 wherein each of said front seat supports (30) comprises first (36) and second (38) legs pivotally mounted to said seat cushion assembly.

17. An assembly as set forth in claim 16 further including a mounting plate (46) having first and second ends for rotatably securing each of said legs (36, 38) of said front seat supports (30) to the vehicle floor (26).

18. An assembly as set forth in claim 17 wherein said first leg (36) is pivotally mounted to said first end of said mounting plate (46) and said second leg (38) is pivotally mounted to said second end of said mounting plate (46) for creating a substantially triangular support configuration.

19. An assembly as set forth in claim 18 wherein said first end of said mounting plate (46) includes an integral arcuate slot (48) and said second end of said mounting plate (46) includes a pivot point (50).

20. An assembly as set forth in claim 19 wherein said first leg (36) pivotally rides within said arcuate slot (48) and said second leg (39) is pivotally mounted to said pivot point (50).

21. An assembly as set forth in claim 20 further including a front control cable (52) connected to said first leg (36) for selectively moving said first leg (36) within said arcuate slot (48) toward said pivot point (50) thereby eliminating said substantially triangular support configuration and allowing said front seat support (30) to collapse against said seat cushion frame (16).

* * * * *